3,608,139
EDGE COVERING APPARATUS
Dale S. Wahlstrom, Mishawaka, Ind., assignor to United States Rubber Company, New York, N.Y.
Original application Feb. 13, 1967, Ser. No. 615,805, now Patent No. 3,491,176, dated Jan. 20, 1970. Divided and this application July 8, 1969, Ser. No. 858,224
Int. Cl. B29f 3/00; B29d 7/22, 29/00
U.S. Cl. 18—4P                                        16 Claims

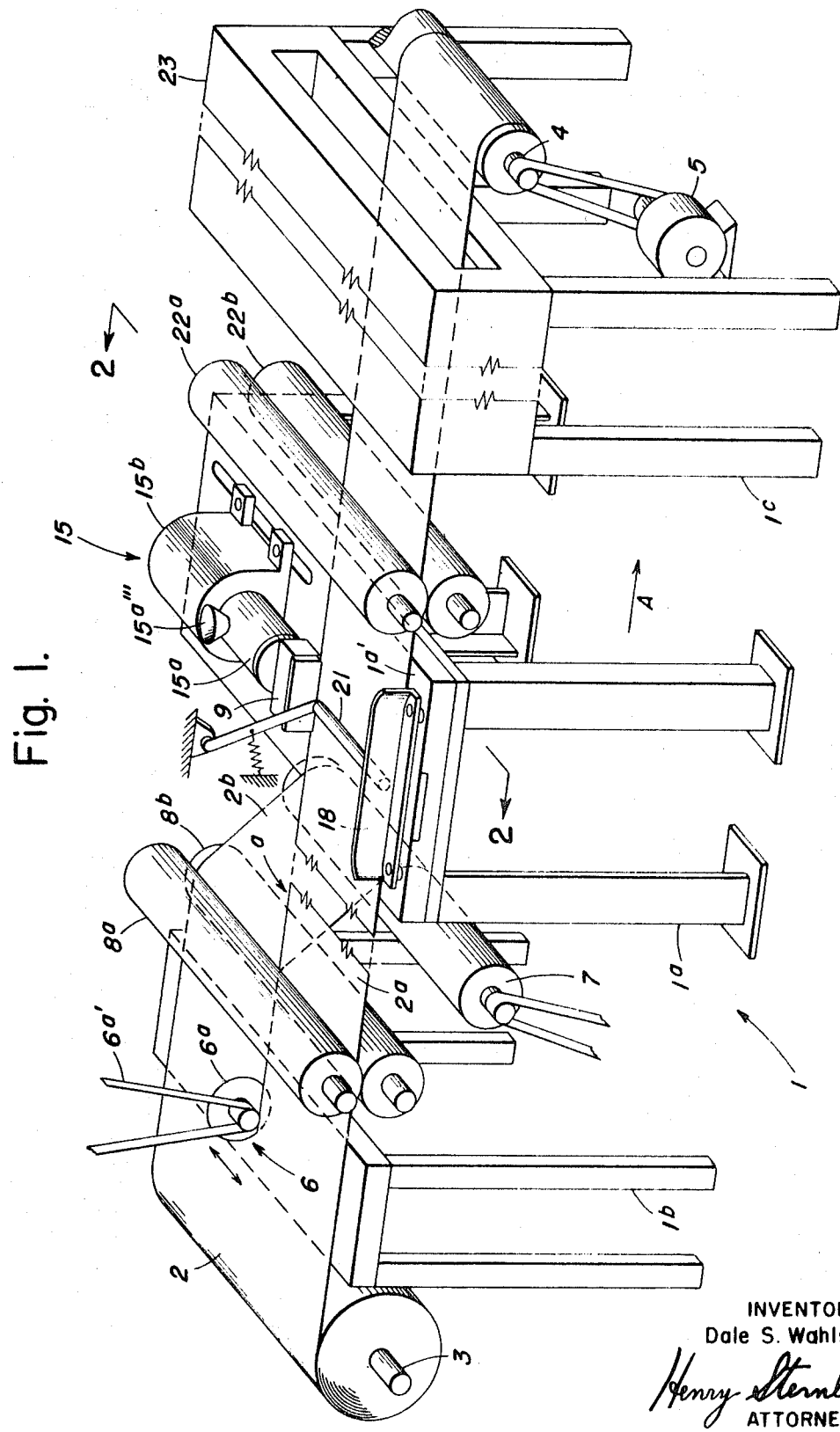
Fig. I.
INVENTOR
Dale S. Wahlstrom
Henry Sternberg
ATTORNEY

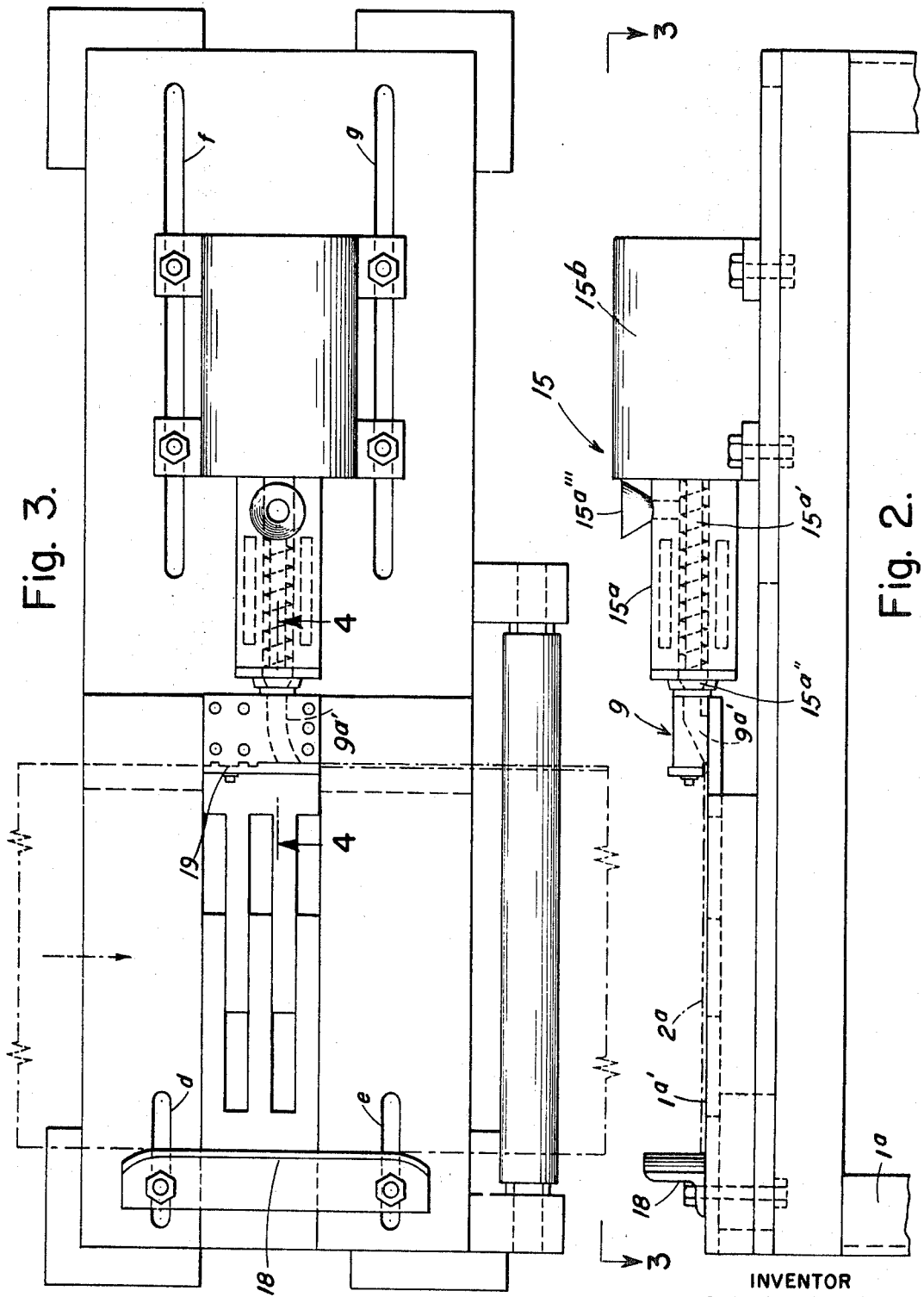

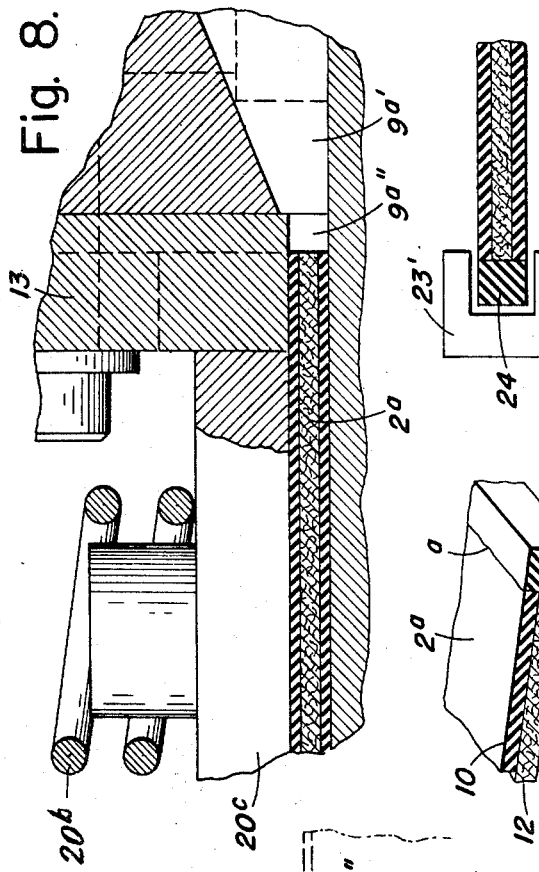
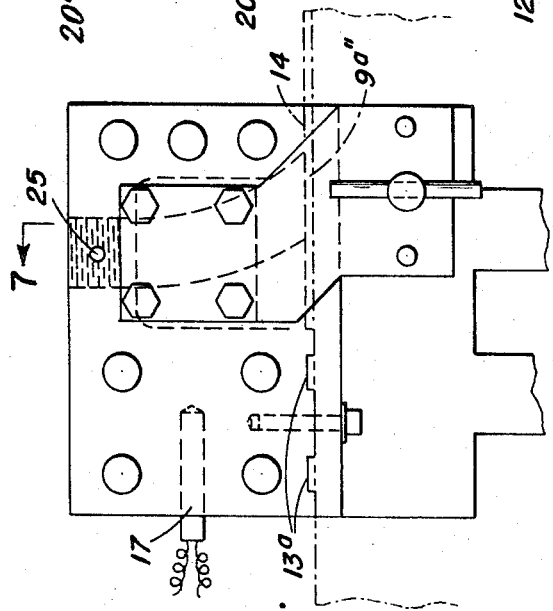
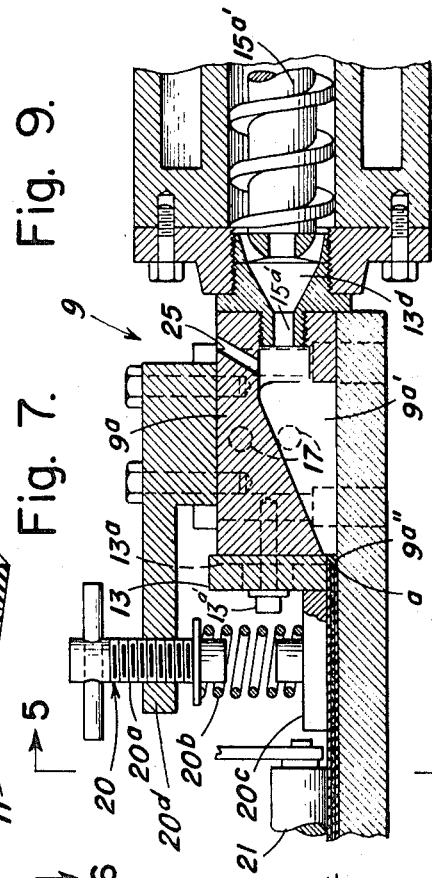
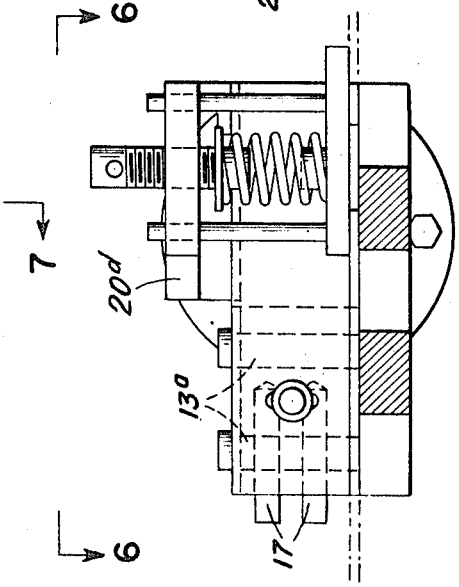
INVENTOR
Dale S. Wahlstrom
Henry Sternberg
ATTORNEY

United States Patent Office 3,608,139
Patented Sept. 28, 1971

ABSTRACT OF THE DISCLOSURE

A method and apparatus for simultaneously forming and applying a cover layer of plastic material to an exposed edge of a belt or the like.

RELATED U.S. APPLICATION

This is a division of application Ser. No. 615,805, filed Feb. 13, 1967, now Pat. No. 3,491,176.

This invention relates to a method of, and apparatus for applying a protective edge covering to articles, and is particularly useful in applying a protective edge covering to the exposed edge faces of cured, rubber-encased, longitudinally cut, conveyor belts.

In industry, conveyor belts of greatly varying size are used. These belts may consist of laminated fabric sheets completely encased in rubber. Belts of this type are quite expensive and the cost of maintaining a large inventory of such belts of varying widths, suited to the use of different customers, is prohibitive. The inventory is therefore, limited resulting in relatively long delays to the customer, delays made necessary by the time required to manufacture a belt to order with any desired width.

It has been suggested to manufacture a belt havnig excessive width and to thereafter cut such belt longitudinally to whatever width is desired by a particular customer. This would eliminate the need for warehousing a vast number of belts in different widths. However, when fabric reinforced rubber belting is longitudinally cut, the edges of the fabric inner layer are left exposed at the cut edge face of the belt. As the belts are often used in very damp atmosphere, the exposed fabric absorbs moisture and the entire fabric may become saturated. This greatly accelerates deterioration of the belt. Furthermore, an unprotected edge of a conveyor belt is subject to rapid wear. Normally, a protective rubber edge is formed on the belt during manufacturing thereof and cured together with the remainder of the rubber belt. The presently known methods, however, for applying an edging to a previously manufactured and cured conveyor belt, are both too cumbersome and costly to make the operation economically feasible, or are not suited for many final applications.

It is a principal object of this invention, therefore, to provide a method and apparatus by which a protective cover may be efficiently and economically applied to the raw edge face of a longitudinally cut conveyor belt.

It is another object of this invention to provide a method whereby a conveyor belt of any desired width, within a prescribed range, may be quickly and economically produced, thus eliminating the necessity for maintaining a vast inventory of belts of varying widths.

A further object of the invention is to provide a novel apparatus for accomplishing the aforesaid method.

Other objects of the invention will become apparent from the following description of a practical embodiment thereof, when taken in connection with the drawings which accompany and form a part of this specification.

In the drawings:

FIG. 1 is a perspective illustration of one possible embodiment of the apparatus according to the present invention;

FIG. 2 is a transverse sectional elevation taken along line 2—2 of FIG. 1 in the direction of the arrows;

FIG. 3 is a top plan view of the portion of the apparatus illustrated in FIG. 2 taken along line 3—3 of FIG. 2 in the direction of the arrows;

FIG. 4 is a fragmentary sectional elevation illustrating, at a scale somewhat larger than FIG. 3, a portion of the structure of FIG. 3 taken along a line 4—4 of FIG. 3 in the direction of the arrows;

FIG. 5 is a transverse sectional elevation fragmentarily illustrating a portion of the structure of FIG. 4 taken along line 5—5 of FIG. 4 in direction of the arrows;

FIG. 6 is a fragmentary top plan view of the structure of FIG. 5 taken along line 6—6 of FIG. 5 in the direction of the arrows;

FIG. 7 is a fragmentary perspective partly cross-sectional illustration of a belt structure finished according to the method of the present invention;

FIG. 8 is a fragmentary transverse sectional elevation taken along the line 7—7 of FIG. 6 in the direction of the arrows but at a somewhat larger scale than FIG. 6; and FIG. 9 is a fragmentary transverse sectional elevation illustrating a heater according to another embodiment of the invention.

The term "plastic material" as used herein is intended to include natural rubber, synthetic rubber, and rubber-like synthetic plastic materials.

The apparatus according to the present invention includes a support means 1, in the form of frames 1a, 1b, and 1c, as illustrated in FIG. 1. A belt 2, to be processed according to the present invention, is carried on a supply roller 3 at one end of the support means and is horizontally supported on flat surface portions of the support means for longitudinal movement in the direction of arrow A, with the lower side face of the advancing belt resting on the flat surface portions. A take-up spool 4, having connected thereto a drive means 5 is located at the opposite, downstream end, of the support means for taking up the finished belt. A cutter means 6 having a cutter blade 6a is carried by frame 1b of the support in any conventional manner (not illustrated). The cutter blade is mounted for rotational movement about an axis which is parallel to the axes of the feed spool 3 and the takeup spool 4. The cutter blade 6a may be driven by any conventional means (not illustrated) such as, for example, may include the drive belt 6a' and is mounted with respect to the support surface of frame 1b so as to cut through the entire thickness of a belt while the latter is advanced along a longitudinal path. Thus, in response to advancement of the belt 2 in the direction of arrow A, the cutter means 6 will cut the belt longitudinally along plane "a" into a pair of elongated belts 2a and 2b. Take-up spool 7, may be driven in any conventional manner by a separate drive means (also not illustrated), or may be connected by conventional means to drive means 5. Spool 7 is located in a position out of the plane which includes the path of movement of the belt 2a so as to take up the cut belt portion 2b and to detour the latter away from the plane of the path of belt portion 2a. Spools 4 and 7 should be driven at substantially the same speed. Preferably the axis of spool 7 is located in a plane spaced from the plane containing the belt portion 2a and parallel thereto. A pair of guide rollers 8a and 8b are respectively located above and below the horizontal side faces of the belt 2, downstream of the cutter means 6, so as to facilitate detouring the cut belt portion 2b out of the aforesaid path and into an inclined path toward the take-up spool 7 which, as seen in FIG. 1 may be located below the plane of belt portion 2a. Cutter means 6 is preferably adjustably mounted for adjustment in axial direction thereof so that the width dimension to which belt portion 2a is cut, may be adjusted to any desired value.

Belt portion 2a next passes over and in contact with the upper horizontal guide surface 1a' of frame 1a which latter is located downstream of frame 1b. Adjacent the path of belt 2a, the frame 1a carries an applicator means 9. Applicator means 9 is located, with respect to belt 2a, adjacent the exposed cut edge face located in plane "a" thereof. The belt 2 is of the conventional reinforced rubber type which includes a central fabric reinforcement layer 12 sandwiched between a pair of outer rubber layers 10 and 11, as best seen in FIG. 7. Cutting of the belt in the plane "a" (FIG. 1) exposes the fabric layer 12. Applicator means 9 includes a first portion, i.e. mold member 9a defining an internal chamber or cavity 9a' having a mouth opening toward the raw vertical edge face "a" of the belt 2a. The mouth of cavity 9a' which is adjacent to the aforesaid raw edge face of the belt is located substantially in a plane parallel to this raw edge face. A vertically disposed plate 13 (FIG. 8) is vertically moveably mounted with respect to the portion 9a, at the forward end of the latter. The vertical movement may be accomplished by means of a tongue and groove engagement as 13a in FIGS. 4, 5, and 6. The plate 13 has a bottom horizontal surface overlying a marginal edge portion of belt 2a. An adjustable means i.e., a locking device such as the screw-clamp arrangement 13a', permits positioning of the bottom of plate 13 above the horizonal support surface 1a', a distance substantially equal to the thickness of belt 2a. The raw vertical edge face of belt 2a together with the bottom surface of plate 13 and the upper surface 1a' form a cavity 9a'' which is hereinafter considered to be an extension of cavity 9a' and a part thereof. The member 9a is formed, on the downstream side of the cavity, as seen in the direction of arrow "A" of FIG. 1, with a wall portion 14 which, together with the plate 13 and surface 1a', defines a die opening parallel to and adjacent the edge "a." The die opening thus formed communicates with the cavity 9a' via cavity 9a''.

Located behind the applicator means 9 is an extruder means 15 preferably including an extruder 15a and an extruder drive means 15b. Extruder 15a includes an extruder screw member 15a' which is mounted for rotation within a co-axial closely fitted cylinder. Plastic material placed in this cylinder is therefore forced to move in axial direction of the cylinder. An axial conduit means 15a'' communicates with the interior of cavity 9a' and connects the latter to the extruder means as best seen in FIG. 4. Thus, plastic material of the type described in greater detail hereinafter, admitted via a material admitting means 15a''' into the extruder cylinder, is forced by the rotation of screw 15a' in a direction normal to the plane of the exposed edge face "a" of the belt. The body of the extruder may be provided with liquid passages for heating and/or cooling of the extruder. Similarly, the applicator means 9 may be provided with heater means shown in the form of pencil-shaped heater members 17, for maintaining the temperature of member 9 and, therefore, of the plastic material in cavity 9a', at a predetermined value.

Frame 1a is formed with a slotted upper wall portion including slots d, e, f and g (FIG. 3) all of which extend in a direction normal to the longitudinal path of the belt. The applicator, extruder and extruder drive means assembly 9, 15 is formed as an integral unit slideably mounted in the slots f and g of frame 1a for movement in said normal direction, as seen in FIGS. 2 and 3. Also carried by the upper wall of frame 1a but on the other side of the space normally occupied by belt 2a, is a guide means 18. This guide means 18 is in the form of an L-shaped member whose horizontal leg is slideably adjustably mounted in the guide slots d and e for movement toward and away from the applicator means 9. A vertical leg of means 18 guides the uncut edge of belt 2a along a longitudinal path as seen in FIGS. 2 and 3, by maintaining the raw edge face of the belt in engagement with a vertical face 19 of applicator 9a so as to properly locate the belt edge face with respect to the cavity 9a', 9a''. The means 18 may, of course, also include resilient means, for example, a spring permanently biasing the L-shaped member toward the applicator means 10 so as to permanently bias the exposed edge face of the belt against the surface 19. Cavity 9a' is preferably shaped so as to have a decreasing cross-section in the direction of the plastic material flow toward the cut edge face of the belt so that the material fills at least the smaller cross-sectional portions of the cavity in the vicinity of the belt edge and is properly compacted upon reaching the surface of the edge face. The cavity 9a' is preferably curved, as seen in FIG. 3, in the direction of movement of the belt 2a, so as to facilitate flow of the plastic material therein in the direction of belt movement.

A presser means 20 located in the immediate vicinity of the mouth of cavity 9a', 9a'' may, as seen in FIG. 4, be in the form of a manually adjustable screw member 20a engaging one end of a coil spring 20b whose other end engages a presser foot 20c so that in response to manual rotation of the screw 20a the spring may be expanded or compressed, respectively decreasing or increasing the pressure exerted thereby on presser foot 20c which in turn presses down upon the upper surface of belt 2a in the immediate vicinity of the mouth of cavity 9a'' so as to prevent lateral buckling of the belt when plastic material is applied to the latter under the pressure of the extruder mechanism. Prevention of such buckling facilitates proper alignment of the belt edge face with respect to the applicator means at all times. For the sake of clarity, presser means 20 has been omitted from FIGS. 1, 2 and 3.

Any other suitable presser means may of course be used in place of the screw member 20a and the spring 20b, as for example, an air or hydraulic cylinder arrangement with regulated pressure. Also, a spring biased roller means 21 may be swivelably mounted on a portion of frame 1a, above the upper side of belt 2a, so as to press the belt downwardly against the guide surface 1a'. The means 21 may take the form of a freely rotatable roller. The additional presser means 21 is preferred when operating on relatively wide, thin, or flexible belts. The combination of members 20c and 21 provide a combined presser means, in the region of the applicator means, which extends across substantially the entire width of the belt 2a so as to practically eliminate the risk of lateral belt buckling in this region and the resulting risk of misalignment of the raw edge face. Downstream of the applicator means 9 there are located a pair of additional guide rollers 22a and 22b, respectively above and below the belt for guiding the latter along said path. Downstream of these rollers there may be located a vulcanizing means 23, supported on farme 1c and preferably including an elongated vulcanizing chamber of known construction, through the interior of which the belt passes during its travel along said longitudinal path. The take-up roller 4, for the completed belt, is located downstream of the vulcanizing means 23. Alternatively, the vulcanizing means may be in the form of a heater 23' (as seen in FIG. 9) located along the path of movement of the belt at about the same location as means 23 but arranged to heat substantially only the extruded edge portion 24 of the belt.

In operation, after the cutter means 6 is axially adjusted for the desired belt width of belt 2a, the leading end (directly, or by way of a "leader" connected to such leading end) of belt 2a is applied to the take-up spool 4 for movement along a first predetermined path, while the leading end (directly, or by way of a "leader" connected thereto) of the cutaway belt portion 2b is applied to the take-up spool 7 for movement along a 2nd predetermined path inclined with respect to the path of movement of belt 2a. With belt 2a proceeding along said first predetermined path, supported by the surface 1a' of support means 1, and with the guide means 18 adjusted to engage one edge of belt 2a and to maintain the opposite, exposed, cut edge in engagement with the guide surface 19 of applicator means 9, plastic material, of the type hereinafter described in more detail, is supplied through the material inlet means 15a''' into the extruder 15a where, in response to actuation of the extruder drive means 15b, the material is extruded through conduit means 15a''—into the converging cavity 9a', filling the latter. Heating elements 17 may be energized through any suitable known circuit means (not illustrated), and together with temperature control means such as thermostats mounted in the region of the cavity 9a' (not illustrated) control the temperature of the plastic mass therein, so that this mass may be maintained in a plastic, moldable state. Continued roation of the extruder screw 15a' forces more plastic material into the cavity 9a' forcing the material already therein into contact with the raw vertical edge face of belt 2a via the cavity extension 9a''. The drive means 5 is adapted to continuously advance the belt 2a in the direction of arrow "A," as seen in FIG. 1, at a rate of speed which is proportional to the extrusion rate of the extruder means 15. The heater means 17 is arranged in a circuit which may include thermostatic control means for maintaining the temperature of the plastic mass in the cavity 9a', 9a'' substantially constant irrespective of the extrusion chamber temperature which latter temperature may vary as a function of the rotational speed of the extruder screw.

The plate 13 of applicator means 9 defines, together with the wall portion 14, the guide surface 1a', and the portion of the vertical edge face of belt 2a momentarily in the region of the applicator means, a die opening through which a portion of the plastic material in the cavity 9a', 9a'', is drawn in response to adhesion with and advancement of the belt 2a in the direction of arrow "A." The plastic mass (e.g. uncured rubber of a composition similar to that specified hereinafter in detail) which emerges from the die opening together with the belt and adhering to the latter, emerges with a cross-sectional shape substantially identical to that of the die opening. Thus, for the rectangular opening illustrated, for example in FIGS. 4 and 8, e.g., an opening equal to the cross-section of cavity 9a'', the edge layer of uncured rubber would assume the shape illustrated in FIG. 7. The edge layer 24 is seen to be adhering to the previously exposed, cut vertical edge surface of the belt. Upon further travel in the direction of arrow "A," the belt may pass, as previously noted, through a vulcanizing means of conventional construction and preferably comprising an oven wherein the rubber edge layer 24 is cured and becomes securely bonded at least to the outer, previously cured rubber layers 10 and 11 of a conventional, cut, conveyor belt, and acts as a protective cover for the fabric reinforcing layer 12 thereof.

Thus, conventional belting may be produced in large quantities and at relatively low cost by known equipment adjusted to produce extra-wide belting. Thereafter, whenever a customer desired belting having a specific lesser width, the extra wide belting is cut longitudinally, in the foregoing manner, resulting in a belt 2a having a width dimension slightly less than the desired width, so that, with the additional width of the covering 24, the required belt width will be achieved.

If desired, belting having two raw edges may be treated in a similar manner by using a pair of applicator means 9 and arranging these on opposite sides of the belt path so as to operate on both edges of the belting simultaneously.

Preferably, the interior of the cavity 9a' as well as the apparatus walls defining the cavity extension 9a'' are coated with polytetrafluoroethylene so as to prevent adherence of the tacky moldable plastic material therein to the walls of the cavity, thus, facilitating the passage of the plastic material therethrough. Furthermore, the applicator means 9a is preferably provided with an escape passage 25, which will permit the escape of excess plastic material from the interior of the cavity in the event that the rate of extrudate flowing into the cavity exceeds the rate of withdrawal of plastic material by the belt, from the cavity through the die opening.

The tacky mass of plastic material is thus applied in plastic state to the vertical edge face of the belt and is simultaneously shaped by the walls of the die opening as the material is drawn through the latter by the belt. The belt is continuously advanced at a predetermined rate of speed. Plastic material, in a plastic state, is continuously fed by the extruder means into contact with the moving belt edge face at a feed rate proportional to the rate of movement of the belt, and the temperature of the plastic material in the cavity is maintained relatively constant. The foregoing simultaneous, continuous application and shaping of the edge layer results in a fast, accurate and therefore economically advantageous operation.

The following materials are listed here as examples only, of materials which have been tested and found to be satisfactory for use, as plastic edging material, in the above manner:

COMPOUND 1

Ingredients: Parts by weight
SBR 1500 (styrene butadiene rubber) _____ 100
Zinc oxide (activator accelerator) _____ 4
MPC Black (medium processing channel
  black _____ 20
HAF Black (high abrasion furnace black) ____ 30
ESTAC (softener and tackifier) _____ 8
BLE (antioxidant—reaction product of acetone
  and diphenylamine) _____ 1
Paraffin wax (processing aid) _____ 1
Stearic acid (processing aid) _____ .8
Zinc oleate (soap—promotes cure) _____ 2
Para tert butylphenol acetylene resin
  (tackifier) _____ 4
Monex (accelerator—tetramethylthiuram
  monosulfide) _____ .6
Litharge (lead oxide) _____ .6

The above components are Banbury mixed for approximately 9 minutes. At the end of this time the temperature will have risen to approximately 240° F. Thereafter the Banbury batch is dumped, allowed to cool, and after cooling is placed again in the Banbury. In a second cycle of mixing sulfur (curative), 2 parts by weight, is added, and the batch is mixed for approximately 3½ minutes, or until the batch temperature rises to 220° F., whichever occurs first. Normally, the 220° F. temperature will be reached in approximately 3½ minutes.

COMPOUND 2

Ingredients: Parts by weight
Smoked sheet (natural rubber) _____ 100
Zinc oxide (activator accelerator) _____ 4
MPC Black (medium processing channel
  black) _____ 52
Pine tar (softener and plasticizer) _____ 4
BLE (antioxidant—reaction product of acetone
  and diphenylamine) _____ 1
Paraffin wax (processing aid) _____ ,3
Stearic acid (processing aid) _____ 1
Reogen (plasticizer and processing aid—mixture of an oil soluble sulfonic acid of high
  molecular weight with a paraffin oil) _____ 10
MODX (activator antioxidant—mixture of inorganic and organic acetates—a proprietary
  mixture of inorganic and organic acetates containing 25% diphenyl ethylenediamine) ____ 1
ESEN (retarder—phthalic anhydride) _____ .8
DELAC-S (accelerator-N-cyclohexyl-2
  benzothiazole sulfenamide) _____ .8
Sulfur (curative) _____ 2.7

The above ingredients are mixed in a Banbury, with the order of addition being that given in the formula. The components are mixed for 9½ minutes, with a gradual rise in Banbury temperature to 215° F., this temperature being reached at the end of 9½ minutes at which time the batch is dropped from the Banbury.

According to the method of the present invention, it is possible to apply a rubber edging to the cut edges of conventional, cured rubber belting. As a result, the belting may be manufactured in very wide widths and cut to specific narrow widths as required. Thereafter, the rubber edging according to the present invention may be applied. This invention, therefore, makes possible the application of a protective rubber edge to the cut edge of cured, conventional, fabric reinforced, rubber belting so that such edge will not be subject to rapid wear and moisture pick-up. The process according to the present invention is suitable for use with the following materials as edging material: natural rubber, neoprene, butyl, Hypalon, GRS or SBR, nitrile, polyurethane and PVC.

It should be noted, however, that certain of these materials, e.g., polyurethane, do not require a curing oven in order to solidify and securely adhere to the edge face of the belt. When such materials are used, the curing step may, of course, be eliminated.

By way of example, the apparatus and process described hereinabove has been used successfully in the following manner:

Natural rubber was cold milled and fed into a 1½ inch tubular extruder with a barrel of 12 inches. The die (cavity) temperature was maintained at 200° F., and the extruder temperature was maintained at 100° F. The extruder was run at 30 r.p.m. A 10 foot applied edge was cured in a vulcanizer at 50 p.s.i. steam pressure for 30 minutes.

The above, of course is intended only to serve as an example, since it will be readily recognized by anyone skilled in tthe art that for different rates of belt movement (i.e. belt speed) the rate of delivery, from the extruder, of plastic material, would have to vary. Varying the screw r.p.m. of the extruder would, however, be accompanied by variation of the extruder temperature which would necessitate a change in the temperature of the die cavity 9a', 9a''.

It will also be noted that a change in the rubber composition would, in any given extruder, call for a different set of operating conditions. But adjustment of the conditions to proper extrusion is believed to be within the skill of anyone familiar with the art of extrusion. Different rubber compositions will, of course, for best results, require different extrusion temperatures. In any event, when using compounds which are self-curing, or contain curatives, it is necessary to extrude the plastic material at a temperature below that at which the material will scorch or begin to cure. Similarly, the vulcanization conditions required, if any, will vary with the composition of the extruded plastic material.

The aforesaid natural rubber and SBR-based edging compounds have been used successfully as edging materials with belting of the following materials, listed as examples only:

Natural rubber, SBR rubber, blends of SBR and natural rubber, cis-polyisoprene and blends thereof with either natural or SBR rubber.

Other plastic materials may be used for the edging so long as such materials are compatible with the base rubber material of the belt so that good adhesion can be obtained at least when a suitable tie coat layer is interposed. The edging material must be flexible within the same temperature ranges and to a similar degree as the remainder of the belt, and must be curable at temperatures which will not degrade the adjacent belt material.

The term plastic materials is intended to include rubber as well as synthetic plastic materials which exhibit, in the presence of the predetermined temperatures prevailing in the cavity 9a', 9a'', the characteristics of a viscous yet flowable, tacky mass of elastomeric material and which will thereafter solidify by cooling, or as in the case of rubber compounds, by vulcanizing. This flowable, tacky mass flows into the Teflon lined cavity 9a', 9a'', filling the latter, and into contact with the exposed edge face of the belt, adhering to the latter for movement therewith through the die opening.

Preferably, the process is a continuous one with the belt 2a continuously cut from a wider belt 2 and moving continuously with respect to the applicator means 9a, while plastic material having the aforesaid properties is continuously extruded into contact with the cut, raw edge face of the belt 2a and is thereupon continuously shaped as it advances with the belt and passes through the die opening.

The invention can also be practiced by holding the belt stationary and by moving the applicator means along the edge of the belt.

While particular embodiments of this invention have been shown and described, it will be obvious to those skilled in the art that various changes and modifications may be made without departing from this invention in its broader aspects, and it is, therefore, aimed in the appended claims to cover all such changes and modifications as fall within the true spirit and scope of this invention.

Having thus described my invention, what I claim and desire to protect by Letters Patent is:

1. In an apparatus for applying a protective covering to an exposed edge face of an elongated sheet member such as a belt or the like, in combination, support means adapted to support an elongated belt for longitudinal movement; belt advance means adapted to advance said belt along said path; and applicator means located along said path in the region of the exposed edge face of said belt, said applicator means including a cavity adapted to receive plastic material and being located adjacent to and opening toward the edge face of the belt and including a cut-out portion at the downstream side thereof, said cut-out portion forming a part of a die means through which plastic material in the cavity and adhering to the edge face of the belt is drawn by the latter when it is advanced along side path, the height of said cut-out portion being substantially equal to the thickness of said belt at said edge face whereby said plastic material is formed on said edge face into a bead having a thickness at least not greater than that of the belt.

2. The apparatus according to claim 1, further comprising cutter means located along the path of movement of the belt for cutting the latter longitudinally into a pair of elongated belt portion during the movement of the latter along said path; said belt advance means adapted to engage one of said belt portions for moving the latter along said path; take-up means adapted to engage the other of said belt portions for moving the latter out of said path in the region of the exposed edge face of said path downstream of said cutter means and in the region of the exposed cut edge face of said one portion of said belt, said die means forming said plastic material into a strip of predetermined cross-section covering said exposed edge face of the belt.

3. In an apparatus according to claim 1, further comprising a source of plastic material, and means for feeding said plastic material from said source into said cavity.

4. In an apparatus according to claim 1, further comprising confining means located along said path adjacent opposite side faces of the belt in the region of said applicator member for preventing buckling of the belt intermediate the edge faces thereof during application thereof and shaping thereon of the plastic material.

5. In an apparatus according to claim 1, further comprising guide means for guiding said one belt portion along said path, and including a guide member located along said path in the region of said applicator for maintaining the exposed edge face of the belt accurately located with respect to said die means during traverse of the belt along said path.

6. In an apparatus according to claim 5, wherein the plastic material is rubber, further comprising vulcanizing means located adjacent to said path downstream of said applicator for curing the rubber of the applied layer so that the latter solidifies and becomes securely bonded to the edge face of the belt to protect the latter.

7. In an apparatus according to claim 1, said applicator comprising heating means for heating the plastic material therein so as to maintain the same at a predetermined temperature.

8. In an apparatus according to claim 1 further comprising extruder means and conduit means connecting said extruder means with the interior of said cavity for extruding plastic material directly into said cavity; and means for driving said extruder means at a predetermined rate of speed.

9. In an apparatus for covering the exposed multi-layer edge face of a longitudinally cut belt or the like, in combination, support means including a substantially horizontal support surface adapted to support one side face of the belt, drive means carried by said support means and adapted to advance a belt supported by said support means longitudinally along a predetermined path; and applicator means cooperating with said support means and located adjacent said path, said applicator means including a first portion defining a cavity having a mouth opening toward and located adjacent to the exposed edge face of a belt positioned on said support means and having on the downstream side of said cavity a die means providing a die opening adjacent to and located substantially in a plane transverse to the edge face of the belt; pressure means located above said horizontal surface in the region of said applicator means and adapted to press on the upper side face of a belt so as to maintain the latter in flat condition on said support surface; and feeder means including conduit means communicating with the interior of said cavity for feeding plastic material thereto at a predetermined rate, so that the plastic material contacts the exposed edge face of the belt portion momentarily overlying said opening and adheres to said edge face so as to be drawn thereby, in response to advancement of the belt along said path, through the die opening whereby the plastic material assumes in cross-section the shape of the die opening.

10. In an apparatus according to claim 9, further comprising means adjacent the mouth of said cavity and overlying opposite side face portions of the belt for preventing plastic material to come into engagement with the side faces of the belt so that the plastic material in said cavity contacts only the exposed edge face of the belt.

11. In an apparatus according to claim 1, said support means including a substantially horizontal support surface adapted to support one side face of the belt, said apparatus further comprising pressure means located above said horizontal surface in the region of said applicator means and adapted to press on the upper side face of a belt so as to maintain the latter in flat condition on said support surface.

12. In an apparatus according to claim 1, wherein said applicator means includes adjustable means for adjusting the size of said cut-out portion so as to conform to belts of different thickness.

13. In an apparatus according to claim 12, wherein said adjustable means includes a vertically movable member having a lower substantially horizontal surface portion adapted to engage the upper side face of a belt, said adjustable means including a first member movably supported by said applicator means for varying the size of the die opening, and means for locking said first member in position with respect to said applicator means.

14. In an apparatus according to claim 11, further comprising guide means adapted to engage the upper side of the belt adjacent said pressure means, said pressure means and said guide means together guiding said belt substantially along its entire width in the region of said applicator means so as to prevent buckling of the belt in said region.

15. In an apparatus according to claim 9, wherein said feeder means includes rotary screw extruder means located on the opposite side of said cavity as said mouth thereof so that materials fed from said extruder means is fed in a direction toward said edge face of the belt, said extruder means being driven at a speed which is proportional to the speed of said belt drive means so that the rate of withdrawal of plastic material through said die opening will substantially equal the rate at which material is extruded into the die cavity.

16. An apparatus for finishing a belt having a pair of cured rubber layers and strength cords embedded between said layers, comprising means for longitudinally advancing said belt, applicator means for continuously applying a mass of uncured rubber to a longitudinal edge face of the belt, shaping means for simultaneously with advance of said belt continuously shaping the mass of rubber into an edge strip adhering to and covering only said edge face of the belt, said shaping means, comprising die means having opposed portions located, at the downstream side thereof, adjacent to and in direct contact with opposite side faces respectively of the belt, in the region of said applicator means, and extending beyond the edge of the belt whereby the edge strip will have a thickness substantially equal to that of the belt, and means located downstream of said latter means for curing the rubber edge strip and bonding the latter firmly to said edge face.

References Cited

UNITED STATES PATENTS

| | | | |
|---|---|---|---|
| 2,101,427 | 12/1937 | Conradi et al. | 118—38 |
| 2,247,447 | 7/1941 | Manka | 118—39 |
| 2,293,252 | 8/1942 | Foster et al. | 18—13 |
| 2,753,597 | 7/1956 | Bird et al. | 18—13X |
| 2,791,807 | 5/1957 | Morin | 18—13X |
| 3,266,091 | 8/1966 | Ouear et al. | 18—13 |
| 3,514,368 | 5/1970 | Netsel | 156—259X |

J. SPENCER OVERHOLSER, Primary Examiner

R. L. SPICER, JR., Assistant Examiner

U.S. Cl. X.R.

18—13E, 2Y; 118—38; 156—259

UNITED STATES PATENT OFFICE
CERTIFICATE OF CORRECTION

Patent No. 3,608,139                     Dated September 28, 1971

Inventor(s) Dale S. Wahlstrom

It is certified that error appears in the above-identified patent and that said Letters Patent are hereby corrected as shown below:

In the heading, column 1, line 4, "United States Rubber Company" should read -- Uniroyal, Inc. -- .

Signed and sealed this 14th day of November 1972.

(SEAL)
Attest:

EDWARD M. FLETCHER, JR.                 ROBERT GOTTSCHALK
Attesting Officer                       Commissioner of Patents

PO-1050
(5/69)

UNITED STATES PATENT OFFICE
CERTIFICATE OF CORRECTION

Patent No. 3,608,139          Dated September 28, 1971

Inventor(s) Wahlstrom, Dale S.

It is certified that error appears in the above-identified patent and that said Letters Patent are hereby corrected as shown below:

Column 8, line 56, delete "in the region of the exposed edge face of" and substitute therefor --; and said applicator means located along--.

Column 8, line 69, change "thereof" (second occurrence) to --thereto--.

Signed and sealed this 17th day of April 1973.

(SEAL)
Attest:

EDWARD M. FLETCHER, JR.
Attesting Officer

ROBERT GOTTSCHALK
Commissioner of Patents